United States Patent
Risch et al.

(10) Patent No.: US 6,215,931 B1
(45) Date of Patent: *Apr. 10, 2001

(54) FLEXIBLE THERMOPLASTIC POLYOLEFIN ELASTOMERS FOR BUFFERING TRANSMISSION ELEMENTS IN A TELECOMMUNICATIONS CABLE

(75) Inventors: Brian G. Risch, Hickory, NC (US); Olivier Tatat, Dusseldorf (DE)

(73) Assignee: Alcatel, Paris (FR)

(*) Notice: Subject to any disclaimer, the term of this patent is extended or adjusted under 35 U.S.C. 154(b) by 0 days.

This patent is subject to a terminal disclaimer.

(21) Appl. No.: 09/236,873

(22) Filed: Jan. 26, 1999

(51) Int. Cl.$^7$ .................................................. G02B 6/44
(52) U.S. Cl. .................... 385/109; 385/110; 385/111; 385/112; 385/113; 385/114
(58) Field of Search ................... 385/100, 102, 385/109–113, 114, 128

(56) References Cited

U.S. PATENT DOCUMENTS

| | | | |
|---|---|---|---|
| 4,687,294 | 8/1987 | Angeles | 385/102 |
| 5,155,789 | 10/1992 | Le Noane et al. | 385/106 |
| 5,181,268 | 1/1993 | Chien | 385/128 |
| 5,195,158 | 3/1993 | Bottoms, Jr. et al. | 385/105 |
| 5,224,192 | 6/1993 | Wagman | 385/112 |
| 5,408,564 | 4/1995 | Mills | 385/128 |
| 5,561,729 | * 10/1996 | Parris | 385/113 |
| 5,561,730 | * 10/1996 | Lochkovic et al. | 385/114 |
| 5,627,932 | 5/1997 | Kiel et al. | 385/102 |
| 5,751,880 | * 5/1998 | Gaillard | 385/109 |
| 5,837,750 | * 11/1998 | Szum et al. | 522/81 |
| 5,907,023 | * 5/1999 | Chawla | 528/49 |
| 5,911,023 | * 6/1999 | Risch et al. | 385/100 |
| 5,936,037 | * 8/1999 | Tasaka | 525/92 B |
| 6,035,087 | * 3/2000 | Bonicel et al. | 385/109 |

FOREIGN PATENT DOCUMENTS 0769711  4/1997  (EP) .

* cited by examiner

Primary Examiner—Rodney Bovernick
Assistant Examiner—Juliana Kang
(74) Attorney, Agent, or Firm—Ware, Fressola, Van Der Sluys & Adolphson LLP

(57) ABSTRACT

A telecommunications cable element having a transmission element disposed in a buffer tube made from thermoplastic polyolefin elastomeric buffer material is disclosed. The polyolefin elastomeric buffer material has a modulus of elasticity below about 500 MPa at room temperature and a modulus of elasticity below about 1500 MPa at −40° C. Preferentially, the thermoplastic polyolefin elastomer material forming the buffer tube has an elongation to break below about 500% and a Melt Flow Index above about 3.

17 Claims, 4 Drawing Sheets

FLEXIBLE THERMOPLASTIC POLYOLEFIN ELASTOMERS FOR BUFFERING TRANSMISSION ELEMENTS IN A TELECOMMUNICATIONS CABLE

BACKGROUND OF THE INVENTION

1. Field of the Invention

The present invention relates to telecommunications cables. More particularly, the present invention relates to telecommunications cables having optical fibers buffered by thermoplastic polyolefin elastomers.

2. Discussion of Related Art

In telecommunications cables having transmission elements such as optical fibers coated with an ultraviolet light curable coating, the transmission elements are typically protected, either individually or as a group, by a buffering material. The relationship between the buffering material and the transmission elements is usually described as either "tight," "near-tight" or "loose." For example, a "tight" buffered optical fiber has buffer material extruded directly over the coated optical fiber. Optical fibers which are "near-tight" buffered have a hollow buffer member, often a tube with an inner diameter slightly larger (up to about 0.4 mm) than the outer diameter of optical fiber or the approximate outer diameter of a plurality fibers contained therein. For example, "near-tight" buffered optical fiber units typically consist of one or a plurality of optical fibers surrounded by a sheath or buffer unit of a flexible material. The flexible buffer unit has a wall thickness of approximately 0.2 mm and an inner radius less than 0.3 mm greater than that of the fiber bundle contained within. More particularly, for example a 4 fiber flexible buffer tube has an outside diameter (OD) of 1.0 mm and an inside diameter (ID) of 0.6 mm. A 6 fiber flexible buffer unit has an OD of 1.15 mm and an ID of 0.75 mm. A 12 fiber flexible buffer unit has an OD of 1.4 mm and an ID of 1.0 mm. Use of such compact buffer units allows the design of cables with overall smaller O.D. and lower weight per unit length. These units also allow a high fiber density in smaller diameter cables.

In a "loosely" buffered optical fiber cable, the inside diameter of the buffer tube is substantially larger (greater than about 0.4 mm) than the outside diameter of the optical fiber or the approximate outside diamter of a bundle of optical fibers. Loosely buffered optical fiber cable designs are well known in the art.

For tight and near-tight buffering applications, a low modulus of elasticity may be desired in order to ensure easy access and handling of buffer units without damaging fibers encapsulated therein. Tight and near-tight buffer members have more contact with the coated fibers. In order to achieve better distribution of contact forces on the coated fiber, a specific range of modulus is required.

Buffer materials typically used for making buffer tubes for buffering optical fibers in a telecommunications cable include plasticized polyvinyl chloride (PVC), polybutylene terephtalate (PBT), polycarbonate (PC) and some polyolefins, for example. The aforementioned materials have advantages and disadvantages when used for buffering optical fibers. For example, some of these materials, such as PC and PBT, are more expensive. Some, such as PVC, do not provide an acceptable modulus of elasticity within the range of temperatures a telecommunications cable may be exposed to during operation. To overcome some of the problems of PVC, some designs use plasticized PVC. However, plasticized PVC may still show a considerable increase in modulus at low temperature. Also, another drawback of plasticized PVC is that plasticizers in the PVC can be leached out by many thixotropic, water blocking gels that are disposed in the buffer tube with the fiber or fibers. Leaching causes an increase in buffer unit modulus and rigidity as well as possible degradation of encapsulated fiber properties. This leaching is most prevalent in polyolefin and polyol based gels. To minimize plasticizer leaching, special grades of plasticized PVC with migration resistant plasticizers and compatible water blocking gels, such as silicone based gels, must be used. Silicone gels, however, much more costly than polyol or polyolefin gels.

The solutions to the leaching problem are relatively expensive and do not totally eliminate the problem. Even if such solutions are used, migration or extraction of plasticizers can still occur through interaction between the fiber coating and buffer member.

SUMMARY OF THE INVENTION

Accordingly, it is an object of the present invention to provide a flexible buffer material for buffering a telecommunications cable element having a modulus of elasticity usable over a wide range of temperatures.

It is another object of the present invention to provide a buffering material for buffering a telecommunications cable element which is compatible with low cost, thixotropic, water blocking gels.

It is yet another object of the present invention to provide a telecommunications cable element having a transmission element buffered with a buffer tube that is easily strippable from the transmission element without special tools.

The foregoing objectives are realized, at least in part, by the buffered telecommunications cable element of the present invention which is a tube formed from a thermoplastic polyolefin elastomeric buffering material having a modulus of elasticity below about 500 MPa at room temperature and a modulus of elasticity below about 1500 MPa at $-40°$ C., and a transmission element disposed in the tube. The transmission element may be an optical fiber, a bundle of optical fibers or an optical fiber ribbon. The transmission element may be disposed in the buffering tube in a tight, near-tight or loose configuration.

Other objects and advantages of the present invention will become apparent to those skilled in the art from the following detailed description read in conjunction with the attached drawings and claims appended hereto.

BRIEF DESCRIPTION OF THE DRAWINGS

For a fuller understanding of the nature and objects of the invention, reference should be made to the following detailed description taken in conjunction with the accompanying drawings, in which.

DETAILED DESCRIPTION OF THE INVENTION

Figure 1:
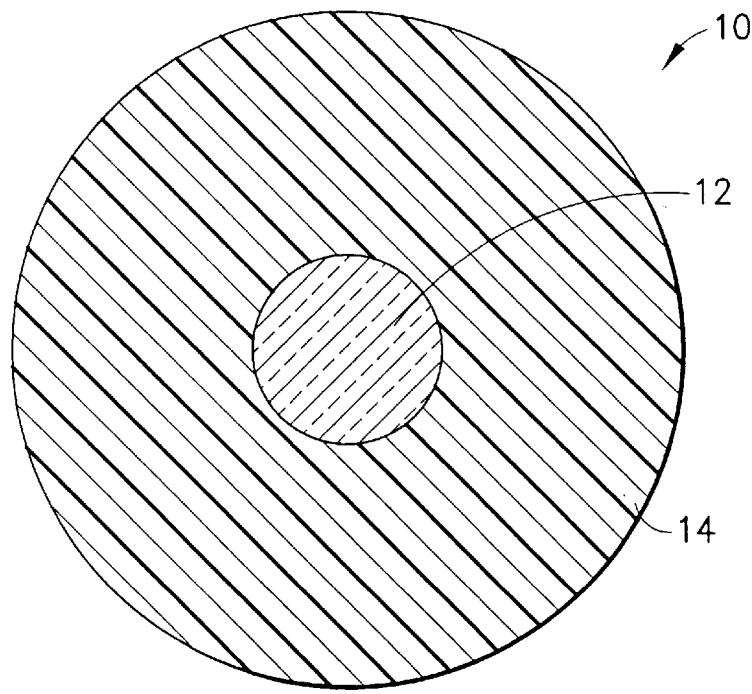
FIG. 1 is a cross-sectional view of a tight buffered telecommunications cable element according to the present invention.
Figure 2A:
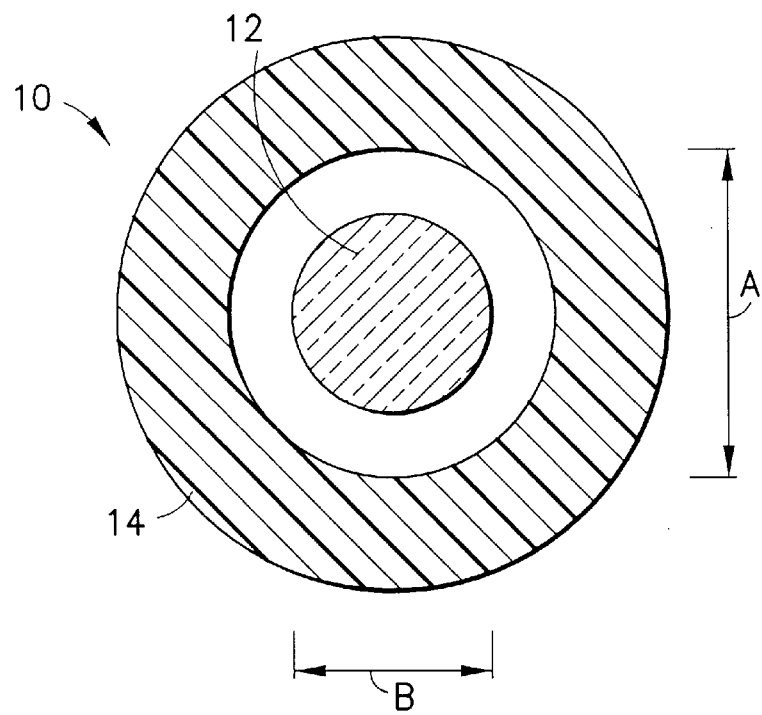
FIGS. 2A and 2B are cross-sectional views of near-tight and loosely buffered telecommunications cable elements according to the present invention.
Figure 2B:
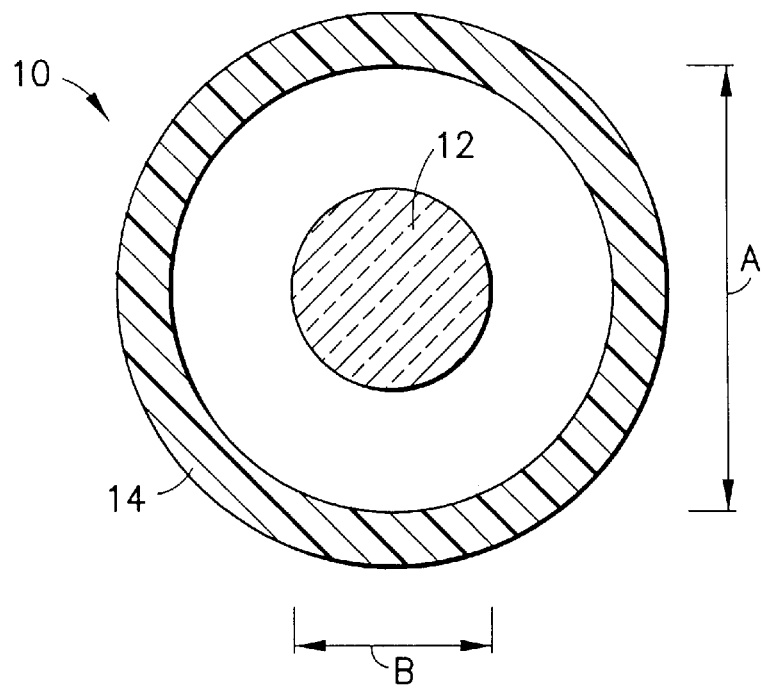

FIG. 1 a telecommunications cable element 10 formed by a transmission element 12 such as a coated optical fiber, and a protective buffer tube 14. In the embodiment illustrated in FIG. 1, the optical fiber 12 is disposed in the buffer tube 14 in a tight configuration to form a tightly buffered optical fiber, i.e., the inside diameter of the tube 14 is substantially the same as the outside diameter of the coated optical fiber 12. FIGS. 2A and 2B illustrate the telecommunications element 10 in a near-tight or loose configuration with respect to the buffer tube 14. In a near-tight configuration, the inside diameter A of the buffer tube 14 ranges from slightly larger than the outside diameter B (usually about 250 mm) of the coated optical fiber 12 to about no more than 0.3 mm larger. In a loose tube configuration, the inside diameter A is typically more than 0.3 mm larger than the outside diameter B. The larger gap between the inside diameter A and the outside diameter B of the fiber permits a greater excess length of fiber to be disposed in the buffer tube.

Figure 3:
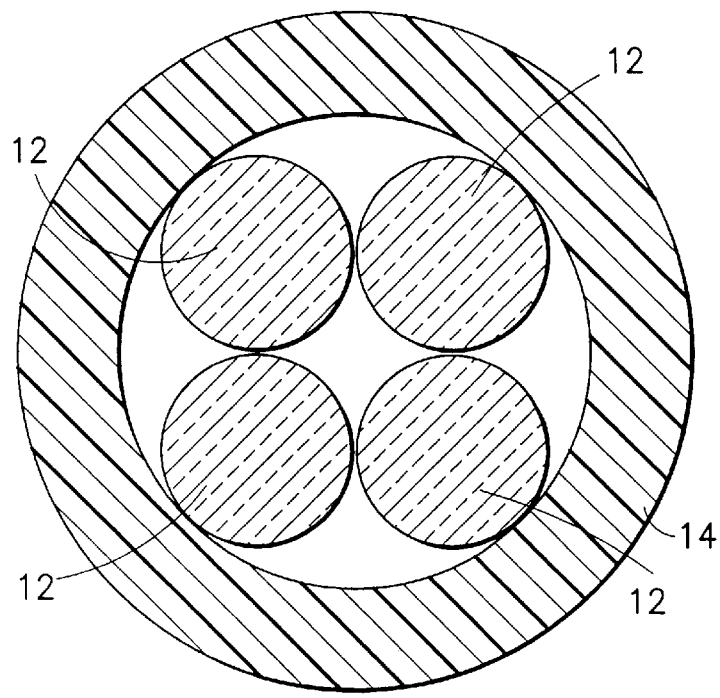
FIG. 3 is a cross-sectional view of another embodiment of a tightly buffered telecommunications cable element containing multiple transmission elements.
Figure 4:
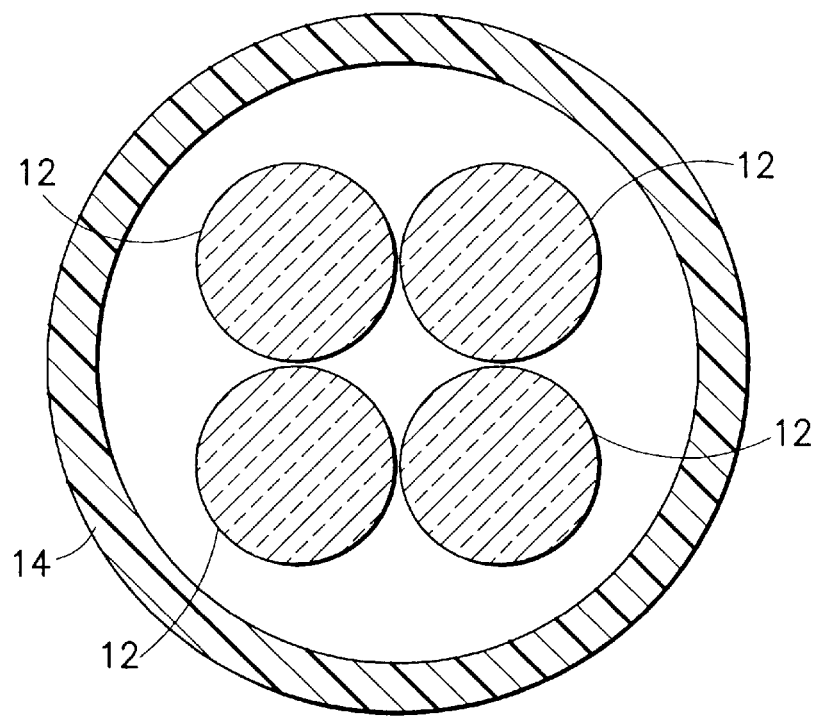
FIG. 4 is a cross-sectional view of a near-tight buffered telecommunications cable element.
Figure 5:
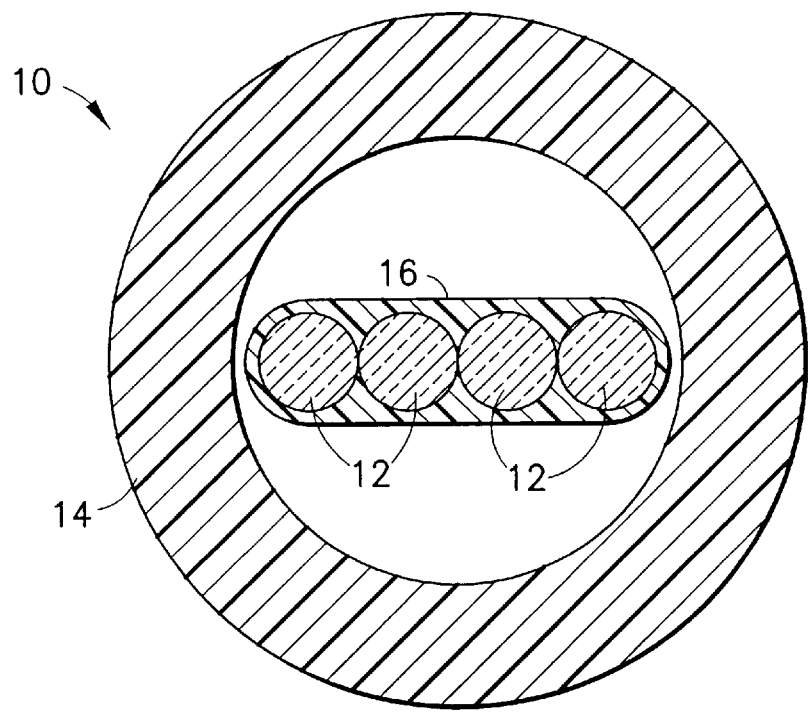
FIG. 5 is a cross-sectional view of a near-tight buffered telecommunications cable element having a plurality of transmission elements arranged in a ribbon.

FIG. 3 illustrates a bundle of optical fibers 12 surrounded by a buffer tube 14 in a tight configuration. FIG. 4, in comparison, illustrates the same bundle of optical fibers disposed in a buffer tube 14 in a near-tight configuration. FIG. 5 illustrates a bundle of optical fibers arranged to form an optical fiber ribbon 16 which is disposed in the buffer tube 14. Those skilled in the art will appreciate that these are merely examples of the variety of configurations for the telecommunications cable element 10 available to those skilled in the art.

According to the present invention, the buffer tube 14 for buffering the transmission element or elements 12 is made from a thermoplastic polyolefin elastomer having a room temperature modulus of elasticity below about 500 MPa and a low temperature (−40° C.) modulus of elasticity below about 1500 MPa. It is preferred that the buffer material have a Melt Flow Index above about 3 as measured under ASTM D-1238, condition L (230° C., 2.16 kg). One example of a thermoplastic polyolefin elastomer having the above physical characteristics is a copolymer of propylene and ethylene. It is preferred that this buffer material has more than 10 weight percent ethylene comonomer. Another example of a thermoplastic polyolefin elastomer material having the above physical characteristics is a terpolymer containing propylene and ethylene.

The buffer tube 14 in the telecommunications cable element 10 may also be made from ultra-low density polyethylene or a copolymer of ethylene and octene provided that such material also have a room temperature modulus of elasticity below about 500 MPa and a low temperature (−40° C.) modulus of elasticity below about 1500 MPa. It is preferred that these materials have a Melt Flow Index above about 3 as measured by ASTM D-1238, condition E (190° C., 2.16 kg). Preferentially, when a copolymer of ethylene and octene is used to form the buffer tube, the octene should comprise more than 10 weight percent of the copolymer.

The thermoplastic polyolefin elastomer material used to form the buffer tube 14 in the telecommunications cable element 10 may also contain organic or inorganic fillers such as talc, calcium carbonate, carbon black, aluminum trihydride, magnesium hydroxide, or some other flame retardant in order to control physical properties such as coefficient of thermal expansion, modulus of elasticity, elongation to break, or flame retardancy. For example, adding calcium carbonate to the polyolefin buffer material of the present invention will reduce the elongation to break. In addition, the buffer material may contain chemical additives such as ultraviolet radiation or thermal stabilizers, plasticizers, or colorants to otherwise modify or enhance the properties of the buffer tube 14 in the telecommunications cable element 10.

Preferably, the thermoplastic polyolefin elastomer material forming the buffer tube 14 should have a low elongation to break (<500%) at room temperature. If the modulus of elasticity and elongation to break are low enough, a tight (FIG. 1) or near-tight (FIG. 2) buffer tube or member 14 can be easily removed without special tools and without damaging the optical fiber or fibers disposed therein. For example, to remove the buffer tube 14, the buffer tube 14 may be pinched or partially cut by a technician and then pulled apart until it breaks. In order for this removal technique to be effective without damaging the optical fiber(s) 12 the polyolefin material must have a low elongation to break and a low modulus of elasticity. If the modulus of elasticity is too high, high pressure must be applied in order to pinch off or separate the buffer tube 14, which runs the risk of causing delamination of cladding from the optical fiber(s) 12. Furthermore, if the elongation to break of the buffer tube 14 is too high, the optical fiber(s) 12 may become strained during the removal process. Typically, access is sufficiently easy if the room temperature modulus of elasticity of the buffer material is below about 500 MPa and the elongation to break is below about 500%, and preferentially, below about 300%, both at room temperature.

The effect of temperature on modulus was conducted on various prior art plasticized PVC buffer tubes as well as polyolefin elastomer buffer tubes made according to the present invention. The materials were tested at room temperature (20 to 25° C.) and at low temperature (−40° C.) to determine the effect of temperature on modulus. According to the test results, the modulus of all of the plasticized PVC material tested at room temperature was about less than 100 MPa while the modulus at low temperature ranged from between 1750 MPa to 2600 MPa for the various materials. According to the test results, the ratio of the low temperature modulus to the room temperature modulus ranged between 40 and 110, indicating that the plasticized PVC has a modulus that changes dramatically as a function of temperature. The high modulus ratio and high modulus at low temperature performance of the plasticized PVC material also indicates that such material will typically exhibit reduced bending performance, greater contact forces on the fiber, and possible embrittlement of a buffer tube placed in the field. Accordingly, the test results also indicate that the plasticized PVC material can exhibit significant strain hardening which leads to an increase in the force required to remove the buffer tube.

In contrast to various plasticized PVC based buffer tubes tested, all of the polyolefin elastomer buffer tubes tested had a room temperature modulus less than about 200 MPa while the modulus at low temperature ranged from between 350 MPa to 1200 MPa for the various materials. According to the test results, the ratio of the low temperature modulus to the room temperature modulus ranged between 10 and 15, which indicates that the modulus of the polyolefin elastomer buffer tubes does not change dramatically as a function of temperature as compared to plasticized PVC.

Figure 6:
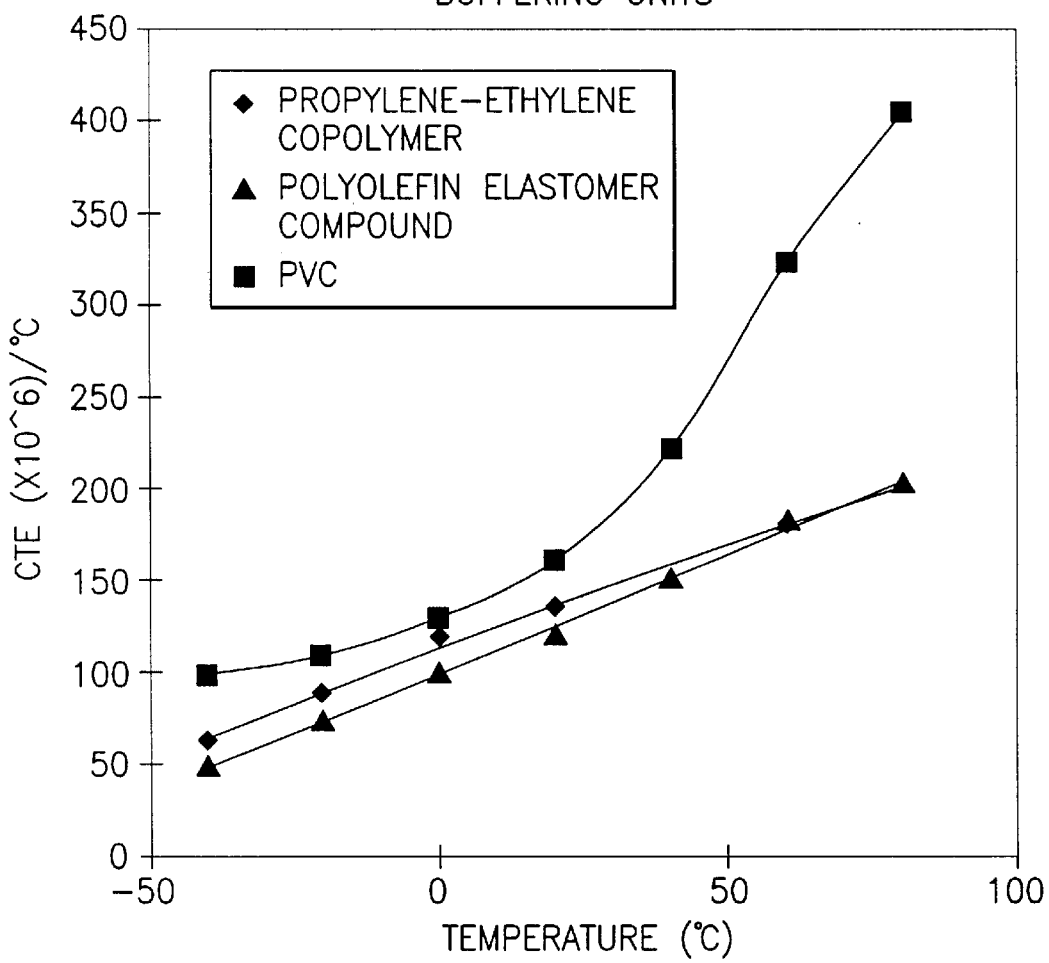
FIG. 6, which is a graphical comparison of the coefficient of thermal expansion of various materials used to make a buffering element.

The coefficient of thermal expansion (CTE) was tested for various plasticized PVC materials as well as for the thermoplastic polyolefin elastomer buffer tubes made according to the present invention. As illustrated in FIG. 6, the CTE of the thermoplastic polyolefin elastomer varied between about $50 \times 10^6/°$ C. at $-40°$ C. to about $200 \times 106/°$ C. at $85°$ C. in a substantially linear manner. The CTE of the plasticized PVC material varied between about 100 at $-40°$ C. to over 400 at $85°$ C. The variation in the CTE as a function of temperature is dramatically lower for the thermoplastic polyolefin elastomeric material than for plasticized PVC materials tested. Also noteworthy is the fact that the measured variation in CTE as a function of temperature of the plasticized PVC was not linear. Linearity in the CTE variation is desirable when designing a telecommunications cable element for use in a wide range of temperatures.

The thermoplastic polyolefin elastomer materials used to form the buffer tube 14 in the telecommunications cable element 10 of the present invention exhibit better compatibility with low-cost, thixotropic, waterblocking gels than does plasticized PVC, for example. The thermoplastic polyolefin elastomer buffer material used to form the tube 14 in the telecommunications cable element 10 of the present invention is compatible with inexpensive and readily available polyol based, thixotropic, waterblocking gels as well as certain polyolefin based gels. In the case of a polyolefin based gel used with the telecommunications cable element 10, interaction between the gel and the buffer material does not cause the changes in modulus of elasticity that has been observed in prior art telecommunications elements having plasticized PVC based buffer structures.

As stated above, the migration of plasticizers from PVC based buffer tubes can cause numerous problems, such as the reduction of the force required to strip the UV curable coating from the optical fiber. Stripping force is a measure of a coated fiber's robustness. Reductions in strip force indicate a decrease in the coated fiber's mechanical reliability. For example, when silicone based water blocking gel was used with a PVC buffer tube, it was observed that the force required to strip the UV curable coating from the optical fiber was reduced. This phenomenon was also observed, to a lesser extent, with coated optical fibers contained in unfilled PVC buffer tubes. This phenomenon is illustrated in Table 1 which shows the reduction in strip force for two cladded optical fibers disposed in buffer tubes made from two different types of PVC buffer materials, PVC #1 and PVC #2, having a silicone based water blocking gel also disposed in the tube with the fibers.

TABLE 1

Reduction in Strip Force Due to Migration of Plasticizers From Flexible Buffer Tubes

| Material Type | Aging Condition | Reduction in Strip Force |
| --- | --- | --- |
| PVC #1 | 6 months @ $85°$ C. | 90% |
| PVC #2 | 45 days @ $110°$ C. | 35% |
| Polyolefin | 6 months @ $85°$ C. | -6% |
| Polyolefin | 45 days @ $110°$ C. | -8% |

PVC #1 contained a pthalate-type plasticizer (diisooctyl pthalate) and PVC #2 contained a trimellitate-type plasticizer (tri-(2-ethylhexyl) trimellitate). It can be seen from Table 1 that when a buffer tube made from PVC #1 was exposed to six months aging at $85°$ C., a reduction in strip force of 90% resulted. The 90 percent reduction in strip force is due to the fact that the pthalate plasticizer easily migrates to the fiber coating. In a second test utilizing PVC #2 as the buffer tube under 45 days aging at $110°$ C., a reduction in strip force of 35% resulted. The trimellitate plasticizer used in PVC #2 has a reduced effect on strip force relative to the pthalate plasticizer but still a significant reduction in strip force is observed. The migration of plasticizers from PVC flexible buffering materials to the fiber coating was verified by extraction of the plasticizers from the fiber coatings with acetone and identification by FTIR spectroscopy. During this extraction process more than 4 times more pthalate type plasticizer was observed to migrate relative to the trimellitate. The results for the two grades of PVC were produced using a silicone based waterblocking gel which was tested to have the minimum effect on the PVC. Reduction in strip force for PVC with polyolefin or polyol based gels is more rapid and severe.

Also shown in Table 1 is a comparable "reduction" in strip force for optical fibers which had thermoplastic polyolefin elastomer buffer tubes made according to the present invention under aging conditions similar to those described above. Table 1 shows that when the buffer tube was made with a thermoplastic polyolefin elastomer material according to the present invention, an increase in strip force was observed. In contrast to the plasticized PVC samples, the polyolefin based materials have no low molecular weight plasticizers which can interact with fiber coatings. Thus, during aging tests strip force actually had a nominal increase due to further thermal curing of the fiber coating during the test. It will be apparent to those skilled in the art that a buffer tube 14 made from the thermoplastic polyolefin elastomer material according to the present invention significantly eliminates the strip force problems associated with prior art plasticized PVC materials.

The thermoplastic polyolefin elastomer of the present invention offers the advantage that no plasticizers are present, so plasticizer leeching will not occur with any gel type, and there is no risk of interaction with the coated optical fibers. Therefore, the compatibility with a wider variety of gels gives the flexible thermoplastic polyolefin elastomer buffer tube 14 a significant design and cost advantage over the prior art.

Another desirable characteristic exhibited by the thermoplastic polyolefin elastomer material used to form the buffer tube 14 in the present invention is the ability to apply the elastomer material to the transmission elements 12 at high speeds. When telecommunications cable elements 10 are manufactured at high speeds, the buffer material generally experiences a high shear rate, and if the viscosity of the extrudate is too high (i.e., the Melt Flow Index is too low), an uneven surface of the extruded buffer tube 14 or other manufacturing defects may result. In a telecommunications cable element 10 having the buffer tube 14 disposed around the optical fiber 12 in a tight configuration (FIG. 1), such an uneven surface may cause signal attenuation by causing microbending of the optical fiber 12. Signal attenuation from microbending can also be caused by post-extrusion shrinkage due to cooling and elastic recovery of the extruded buffer tube 14. Both of these aforementioned problems can be minimized if the elastomer material of the present invention has a Melt Flow Index above about 3. It will now be recognized by those skilled in the art that the buffer tube 14 according to the present invention can be extruded using any well known extrusion process at line speeds above 50 meters per minute, and up to several hundred meters per minute.

In addition to the above described tests, the post extrusion shrinkage of various plasticized PVC materials and the thermoplastic polyolefin elastomer buffer tubes was measured after 1 hour at $85°$ C. and after 1 hour at $100°$ C. All examples of the plasticized PVC materials exhibited a post extrusion shrinkage of about 5 percent at $85°$ C. and between 5.5 and 7.5 percent at 100° C. In contrast, the thermoplastic polyolefin elastomer buffer tubes exhibited post extrusion shrinkage between about 2 and 3 percent at both measurement temperatures. As the measurements indicate, the post extrusion shrinkage of PVC is higher than that of the thermoplastic polyolefin elastomer based materials used. The reduction of post extrusion shrinkage below 5% is critical. Optical fiber buffer tubes are typically designed so that a small amount of excess fiber length is included in any given length of the cable. As a result, the cable structure, with an overall modulus less than glass, can be subjected to a small amount of strain before the optical fibers are subjected to stress. Thereby, the optical fibers can operate in a strain-free state during installation and use. If optical fibers are subjected to tensile strain, high attenuation may result, making the cable useless. The amount of excess fiber length is a critical design feature for a cable and is very important for determining cable reliability. If an increase in excess fiber length is caused by excessive post extrusion shrinkage, optical fibers may impinge on buffer tube walls at ambient or low temperature use. Constraint of optical fibers by buffer tube walls is another mechanism by which attenuation can be caused. Such constraint places lateral strain on the fibers and can increase the level of attenuation in a fiber above requirements for use. Due to these design considerations, restrictions are placed on allowable buffer tube shrinkage within the fiber optic industry. It is stated in the United States Department of Agriculture Rural Electrical Administration Bulletin 1753F-601(PE-90) "REA Specification for Filled Fiber Optic Cables" on page 10 that "shrinkback shall not exceed 5 percent". Compliance with this specification as well as others is an important requirement for fiber optic cable designs.

Table 2 illustrates some examples of some preferred compositions for the buffering material of the present invention. Table 3 presents some testing results for the materials listed in Table 2 and the two types of plasticized PVC described above.

TABLE 2

Formulation of Flexible Buffering Materials

| Material | Propylene-Ethylene Copolymer | Ethylene-Octene Copolymer | Calcium Carbonate | EPR Rubber |
|---|---|---|---|---|
| A Propylene-Ethylene Copolymer | 100% | — | — | — |
| B Propylene-Ethylene Copolymer | 60% | — | 40% | — |
| C Flexible Polyolefin | 40% | 35% | 25% | — |
| D Flexible Polyolefin | 50% | 15% | 35% | — |
| E Flexible Polyolefin | 55% | 5% | 40% | — |
| F Flexible Polyolefin | 65% | 35% | — | — |
| G Flexible Polyolefin | 50% | — | 35% | 15% |

TABLE 3

Properties of Flexible Buffering Materials

| Material | Density | Modulus (MPa) 25° C. | Elongation at Break | Gel Compatibility* |
|---|---|---|---|---|
| A Propylene-Ethylene Copolymer | 0.88 g/cc | 120 | 1100% | Si, OH, poly α-O (<60° C.) |
| B Propylene-Ethylene Copolymer | 1.24 g/cc | 220 | 400% | Si, OH, poly α-O (<60° C.) |
| C Flexible Polyolefin | 1.07 g/cc | 120 | 285% | Si, OH |
| D Flexible Polyolefin | 1.16 g/cc | 140 | 270% | Si, OH |
| E Flexible Polyolefin | 1.22 g/cc | 160 | 270% | Si, OH |
| F Flexible Polyolefin | 1.17 g/cc | 188 | 300% | Si, OH, poly α-O (<60° C.) |
| G Flexible Polyolefin | 1.19 g/cc | 120 | 250% | Si, OH, poly α-O (<60° C.) |
| H PVC #1 | 1.44 g/cc | 16 | 170% | Si |
| I PVC #2 | 1.32 g/cc | 59 | 300% | Si |

*Si- Silicone based gels
OH- Polyol based gels such as Caschem 117-M2 or Astor 600/1
Poly α-Olefin based gels which contain no low molecular weight fractions such as Mastergel 1806 or Henkel CF-363.

One of the advantages realized by the present invention and shown by Table 3 is that a thermoplastic polyolefin elastomer material according to the present invention is less dense than comparable plasticized PVC. A reduction in density is advantageous because it allows for a reduction in cable weight.

It can be seen from the foregoing disclosure that the present invention offers a telecommunications element 10 having an optical fiber 12 disposed in a buffer tube 14 made from a thermoplastic polyolefin elastomer material which has a desirable modulus of elasticity at temperatures commonly experienced by optical fiber cables, improved compatibility with low cost, thixotropic, water blocking gels, and can be manufactured at high line speeds. Further, the telecommunications element 10 of the present invention has a buffer material which is halogen free and can be made flame retardant.

Although the present invention has been described with respect to one or more particular embodiments of the device, it will be understood that other embodiments of the present invention may be made without departing from the spirit and scope of the present invention. Hence, the present invention is deemed limited only by the appended claims and the reasonable interpretation thereof.

What is claimed is:

1. A telecommunications cable element comprising:
   a buffer tube made from a thermoplastic polyolefin elastomer material having a modulus of elasticity below about 500 MPa at room temperature and a modulus of elasticity below about 1500 MPa at −40° C.; and
   a transmission element disposed in the buffer tube.

2. The telecommunications cable element of claim 1, wherein the thermoplastic polyolefin elastomer material has a melt flow index above about 3.

3. The telecommunications cable element of claim 1, wherein the thermoplastic polyolefin elastomer material is a copolymer of propylene and ethylene.

4. The telecommunications cable element of claim 3, wherein the copolymer contains more than 10 weight percent ethylene.

5. The telecommunications cable element of claim 1, wherein the thermoplastic polyolefin elastomer material is a copolymer of ethylene and octene.

6. The telecommunications cable element of claim 5, wherein the copolymer material contains more than 10 weight percent octene.

7. The telecommunications cable element of claim 1, wherein the thermoplastic polyolefin elastomer material has an elongation to break below about 500% at room temperature.

8. The telecommunications cable element of claim 1, wherein the thermoplastic polyolefin elastomer material has an elongation to break below about 300% at room temperature.

9. The telecommunications cable element of claim 1, wherein the thermoplastic polyolefin elastomer material is a terpolymer containing propylene and ethylene.

10. The telecommunications cable element of claim 1, wherein the thermoplastic polyolefin elastomer material includes a filler selected from the group consisting of talc, calcium carbonate, carbon black, aluminum tri-hydride and magnesium hydroxide.

11. The telecommunications cable element of claim 1, wherein the thermoplastic polyolefin elastomer material includes a flame retardant material.

12. The telecommunications cable element of claim 1, wherein the transmission element is an optical fiber.

13. The telecommunications cable element of claim 12, wherein the optical fiber is disposed in the tube in a tight configuration.

14. The telecommunications cable element of claim 12, wherein the optical fiber is disposed in the tube in a near-tight configuration.

15. The telecommunications cable element of claim 1, wherein the transmission element is a plurality of optical fibers in a loose configuration.

16. The telecommunications cable element of claim 15, wherein the plurality of optical fibers are arranged in a ribbon.

17. The telecommunications cable element of claim 1, wherein the thermoplastic polyolefin elastomer material has a coefficient of thermal expansion of about $50 \times 10^6/°$ C. at $-40°$ C. and about $200 \times 10^6/°$ C. at $85°$ C.

* * * * *